US010204464B2

(12) United States Patent
Eberwine et al.

(10) Patent No.: US 10,204,464 B2
(45) Date of Patent: Feb. 12, 2019

(54) CLOUD-BASED WIRELESS COMMUNICATION SYSTEM AND METHOD FOR UPDATING A READER DEVICE

(71) Applicant: XceedID Corporation, Golden, CO (US)

(72) Inventors: Todd Eberwine, Lakewood, CO (US); Jeffrey Scott Neafsey, Golden, CO (US)

(73) Assignee: Schlage Lock Company LLC, Carmel, IN (US)

( * ) Notice: Subject to any disclaimer, the term of this patent is extended or adjusted under 35 U.S.C. 154(b) by 0 days.

(21) Appl. No.: 13/969,415

(22) Filed: Aug. 16, 2013

(65) Prior Publication Data
US 2014/0052777 A1 Feb. 20, 2014

Related U.S. Application Data

(60) Provisional application No. 61/684,128, filed on Aug. 16, 2012.

(51) Int. Cl.
*G07C 9/00* (2006.01)
*H04L 29/06* (2006.01)
*H04L 29/08* (2006.01)

(52) U.S. Cl.
CPC ..... *G07C 9/00174* (2013.01); *G07C 9/00309* (2013.01); *G07C 9/00571* (2013.01);
(Continued)

(58) Field of Classification Search
CPC ............ G07C 9/00174; G07C 9/00309; G07C 9/00571; H04L 63/10; H04L 63/18; H04L 67/26
(Continued)

(56) References Cited

U.S. PATENT DOCUMENTS 6,405,035 B1 * 6/2002 Singh .................. H04M 3/487
455/414.1
8,922,333 B1 12/2014 Kirkjan
(Continued)

FOREIGN PATENT DOCUMENTS

CN 101765240 A 6/2010
CN 101848438 A 9/2010
(Continued)

OTHER PUBLICATIONS

"Exploring centrality for message forwarding in opportunistic networks" by Kuang Xu; Victor O. K. Li; and Jaewoo Chung; The 2010 IEEE Conference on Wireless Communications and Networking (WCNC), Sydney, NSW, Australia, Apr. 18-21, 2010. In Proceedings of the IEEE WCNC, 2010, p. 1-6 available at http://hdl.handle.net/10722/126111.*
(Continued)

*Primary Examiner* — David Orange
(74) *Attorney, Agent, or Firm* — Taft Stettinius & Hollister LLP

(57) ABSTRACT

A server may receive information from a computer, store the information in a database at the server, determine a reader device that is configured to receive and/or process credential information and/or a unique identifier and to receive the information based on an analysis of the information, select one or more mobile devices to deliver the information to the reader, and transmit data to the one or more mobile devices where the data includes at least a portion of the information.

10 Claims, 3 Drawing Sheets

(52) U.S. Cl.
CPC .............. *H04L 63/10* (2013.01); *H04L 63/18* (2013.01); *H04L 67/26* (2013.01); *G07C 2009/00841* (2013.01)

(58) Field of Classification Search
USPC ........................................................ 455/420
See application file for complete search history.

(56) References Cited

U.S. PATENT DOCUMENTS

| | | | |
|---|---|---|---|
| 2006/0072755 A1* | 4/2006 | Oskari | 380/270 |
| 2009/0006834 A1* | 1/2009 | Rothman | G06F 8/65 |
| | | | 713/2 |
| 2009/0217718 A1 | 9/2009 | Porter et al. | |
| 2009/0295571 A1* | 12/2009 | Hosey | 340/540 |
| 2010/0075656 A1* | 3/2010 | Howarter et al. | 455/420 |
| 2010/0097239 A1 | 4/2010 | Campbell et al. | |
| 2010/0135201 A1* | 6/2010 | Lewis | H04W 12/08 |
| | | | 370/328 |
| 2010/0261453 A1 | 10/2010 | Menzel | |
| 2010/0283579 A1* | 11/2010 | Kraus et al. | 340/5.7 |
| 2011/0187505 A1 | 8/2011 | Faith et al. | |
| 2011/0311052 A1* | 12/2011 | Myers et al. | 380/270 |
| 2012/0280783 A1* | 11/2012 | Gerhardt | G07C 9/00309 |
| | | | 340/5.6 |
| 2013/0091561 A1 | 4/2013 | Bruso et al. | |
| 2013/0127593 A1 | 5/2013 | Kuenzi | |
| 2013/0335193 A1 | 12/2013 | Hanson | |
| 2014/0049370 A1 | 2/2014 | Eberwine et al. | |
| 2014/0051407 A1 | 2/2014 | Ahearn et al. | |
| 2014/0051425 A1 | 2/2014 | Ahearn et al. | |

FOREIGN PATENT DOCUMENTS

| | | |
|---|---|---|
| CN | 102300204 A | 12/2011 |
| CN | 102426715 A | 4/2012 |
| JP | 2010516554 A | 5/2010 |
| WO | 2011034482 A1 | 3/2011 |
| WO | 2011159921 A1 | 12/2011 |

OTHER PUBLICATIONS

International Search Report for PCT/US2013/055459 dated Nov. 8, 2013, 2 pages.
Written Opinion of the International Searching Authority for PCT/US2013/055459 dated Nov. 8, 2013, 5 pages.
Canadian First Office Action; Canadian Intellectual Property Office; Canadian Patent Application No. 2,886,378; dated Jul. 5, 2016; 4 pages.
Chinese Search Report; State Intellectual Property Office of China; Chinese Application No. 201380052876.4; dated Apr. 26, 2016; 2 pages.
Chinese Office Action; State Intellectual Property Office of China; Chinese Application No. 201380052876.4; dated May 5, 2016; 7 pages.
Extended European Search Report; European Patent Office; EP Application No. 13829722.1; dated Apr. 8, 2016; 7 pages.
Canadian Office Action; Canadian Intellectual Property Office; Canadian Patent Application No. 2,886,378; dated May 11, 2017; 4 pages.
Chinese Office Action; State Intellectual Property Office of China; Chinese Application No. 201380052876.4; dated Oct. 11, 2017; 5 pages.
Canadian Office Action; Canadian Intellectual Property Office; Canadian Patent Application No. 2,886,378; dated Apr. 24, 2018; 4 pages.
European Examination Report; European Patent Office; European Patent Application No. 13829722.1; dated Jun. 13, 2018; 10 pages.
Mexican Office Action; Mexican Patent Office; Mexican Application No. MX/a/2015/002063; dated Mar. 7, 2018; 7 pages.
Mexican Office Action (second); Mexican Patent Office; Mexican Application No. MX/a/2015/002063; dated Jul. 27, 2018; 10 pages.

* cited by examiner

CLOUD-BASED WIRELESS COMMUNICATION SYSTEM AND METHOD FOR UPDATING A READER DEVICE

CROSS-REFERENCE TO RELATED APPLICATIONS

The present application claims the benefit of U.S. Provisional Patent Application No. 61/684,128 filed on Aug. 16, 2012, the contents of which are incorporated herein by reference in their entirety.

BACKGROUND

Various devices may be employed for providing information, such as updated information, to a reader device. Some existing systems have various shortcomings relative to certain applications. Accordingly, there remains a need for further contributions in this area of technology.

SUMMARY

One embodiment of the present invention is a unique wireless communication system and method. Other embodiments include apparatuses, systems, devices, hardware, methods, and combinations for a wireless communication system. Further embodiments, forms, features, aspects, benefits, and advantages of the present application shall become apparent from the description and figures provided herewith.

BRIEF DESCRIPTION OF THE FIGURES

The description herein makes reference to the accompanying figures wherein like reference numerals refer to like parts throughout the several views, and wherein.

DETAILED DESCRIPTION OF THE ILLUSTRATIVE EMBODIMENTS

Figure 1:
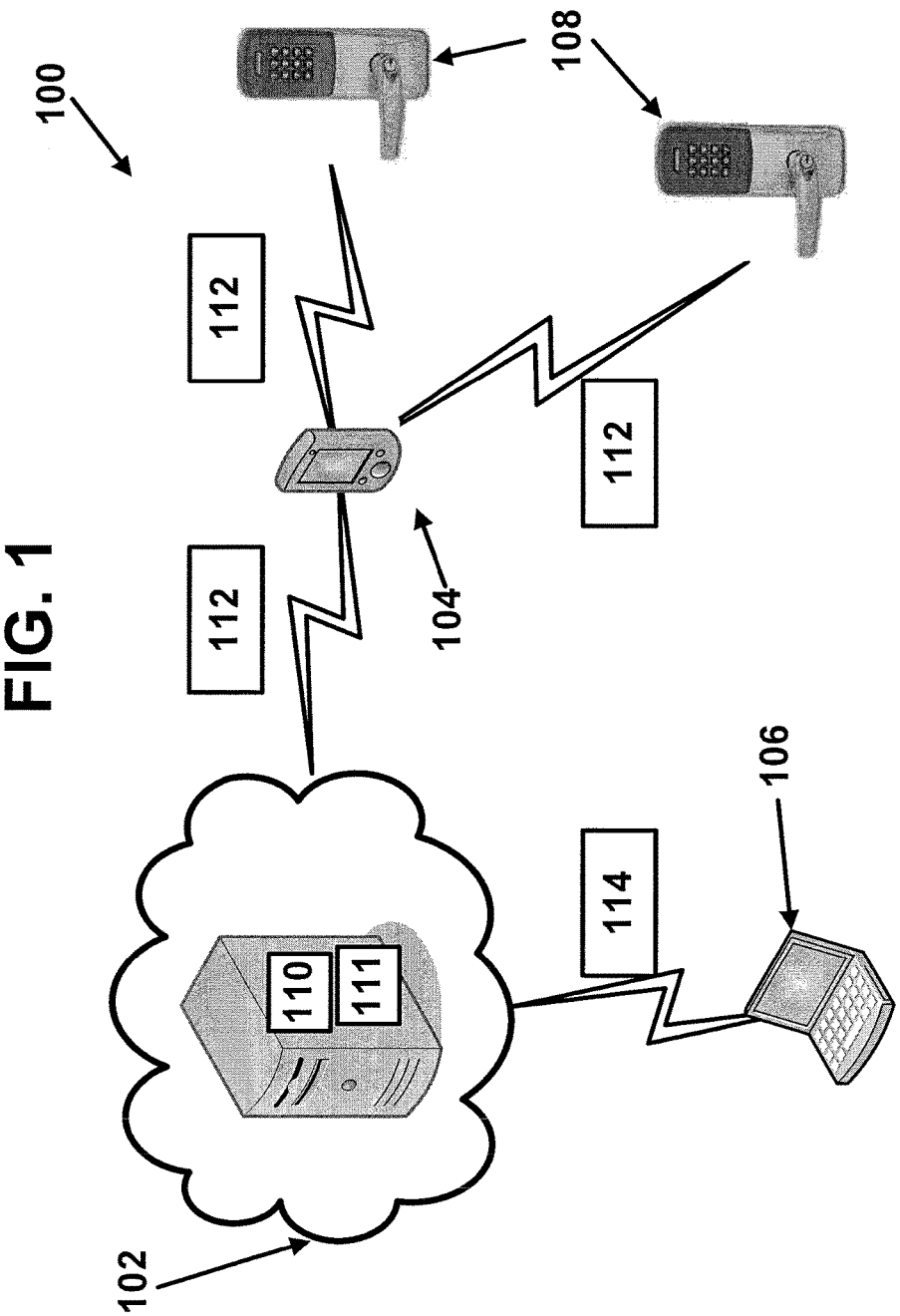
FIG. 1 is a schematic block diagram of an exemplary system according to one form of the present invention.

For the purposes of promoting an understanding of the principles of the invention, reference will now be made to the embodiments illustrated in the drawings and specific language will be used to describe the same. It will nevertheless be understood that no limitation on the scope of the invention is hereby intended. Any alterations and further modifications in the described embodiments, and any further applications of the principles of the invention as described herein are contemplated as would normally occur to one skilled in the art to which the invention relates.

FIG. 1 illustrates an exemplary system 100. In the embodiment shown in FIG. 1, the system 100 is an access control system. It is contemplated that in other embodiments, the system 100 may be directed to a payment system, a transit system, or any other system that utilizes a credential or a unique identifier. The system 100 generally includes a server or credential management device 102, a mobile device 104, a computer or computing device 106, and a reader device 108. The server 102 may provide a credential management service which, in the illustrated embodiment, includes a cloud application 110. The credential management service, via the cloud application 110, may generally maintain a database 111 of access control information, alarm information, and/or audit history information for various assets. It is contemplated that the type of data stored in the database 111 may vary depending on the type of system (e.g., access control system, payment system, transit system, etc.). The server 102 may include multiple servers. Additionally, the server 102 may communicate with the mobile device 104 and/or the computer 106 via the Internet.

In the embodiment shown in FIG. 1, the mobile device 104 is a mobile phone such as, for example, a cell phone or smartphone. However, it is contemplated that in other embodiments, the mobile device 104 may be a tablet computer, a smartcard, or any or any other mobile computing or communication device that can store data and communicate with the reader device 108. It is also contemplated that the computer 106 may be any type of computing device such as, for example, a desktop computer, a laptop computer, a tablet computer, a mobile device (e.g., a smartphone), and/or other suitable computing devices know to those skilled in the art.

In the embodiment shown in FIG. 1, the reader device 108 is associated with an electronic lock and is configured to communicate with the mobile device 104. However, it is contemplated that in other embodiments, the reader device 108 may be any other type of device configured to communicate with the mobile device 104 and receive and/or process credential information or a unique identifier.

In some embodiments, the system 100 utilizes one or more mobile devices 104 as a transport or delivery mechanism for delivering information (e.g., access privileges) to the reader device 108 and/or for receiving alarm information and/or audit history feedback from the reader device 108. The mobile device 104 may include a near field communication (NFC) transceiver configured to communicate with a NFC transceiver that is part of the reader device 108. It is contemplated that the mobile device 104 and the reader device 108 may communicate via a wireless personal area network protocol other than NFC such as, for example, BLUETOOTH including BLUETOOTH Low Energy (BLE) or any other appropriate communication protocol. The reader device 108 may be integrated into an electronic lock or be associated with an electronic lock. Other types of suitable reader devices 108 are also contemplated as would occur to those skilled in the art.

The reader devices 108 (e.g., electronic locks) may be incorporated into doors or other access restriction structures or devices. The mobile device 104 is configured to wirelessly communicate with the cloud application 110 in the server 102 via an Internet connection, which may utilize, for example, a cellular data network or other types of wireless communication networks. The mobile device 104 includes a memory for storing viral data 112 such as, for example, access control information, alarm information, and/or audit histories. The mobile device 104 may be configured to transmit feedback data in real-time back to the server 102 including the cloud application 110. The mobile device 104 is configured to implement "viral data" which includes data that does not pertain to a particular user, but generally pertains to several users. Furthermore, the user is generally unaware that the user is delivering and/or receiving viral data.

The computer 106 may be used to create, update, or otherwise modify access information 114 stored at the server 102. Generally, when the server 102 receives access information 114 from the computer 106 to be transmitted to a particular reader device 108, the server 102 (via the cloud application 110) transmits the access information in the form of viral data 112 to some or all of the mobile devices 104 of users who may access privileges to the reader device 108 that is to be updated. For example, the server 102 (via the cloud application 110) may transmit the new or updated data to only the mobile devices 104 that interact with the particular reader device 108 most frequently. As another example, the viral data 112 for the reader device 108 may be delivered to each user (i.e., via mobile devices 104) who has immediate access to that reader device 108 so that the next user to approach the reader device 108 will deliver that viral data 112 to the particular reader device 108. It is contemplated that the viral data 112 may also include firmware updates and/or activation information for the reader device 108.

In one embodiment, when the viral data 112 is delivered by the mobile device 104, the mobile device 104 may report back to the server 102 to verify that the viral data 112 was successfully transferred. Other mobile devices 104 may then be updated by the server 102 to remove that particular update (i.e., delete the viral data 112). It is contemplated that this viral data updating technique may be used with any number of doors and/or reader devices 108.

In some embodiments, the mobile device 104 may receive alarm information and/or audit histories/trails in the form of viral data 112 from a particular reader device 108 immediately whenever someone visits the reader device 108 and/or door. It is contemplated that to ensure the viral data 112 is successfully delivered to the server 102, the viral data 112 may be transmitted to multiple mobile devices 104 until the reader device 108 receives an update and/or notification that the latest alarm information and/or audit histories/trails were received at the server 102. Furthermore, it is contemplated that the viral data 112 from the reader device 108 may be delivered to the server 102 immediately upon receipt. The server 102 may store the received alarms and/or audit trails in the database 111. A user may utilize the computer 106 to access and/or retrieve the alarms and/or audit trails in the database 111.

Generally, the memory of the mobile device 104 stores the viral data 112 (e.g., access privileges, alarms, and/or audit history data) so that the viral data 112 can be transported from the reader device 108 to the server 102 via the mobile device 104. Each credential holder (i.e., mobile device 104) has virtually unlimited memory for viral data 112 such as, for example, access privileges, alarm information, audit history data, firmware updates, and/or any other data to be shared between the server 102 and the reader 108. In one embodiment, the viral data 112 is transmitted from the reader device 108 to the server 102 immediately, which provides near real-time performance.

The use of viral data 112 in the system 100 may provide control of off-line reader devices 108 (e.g., electronic locks) and may eliminate the need to tour the reader devices 108 to provide updates to the reader devices 108 or gather alarms and/or audit histories from the reader devices 108.

Figure 2:
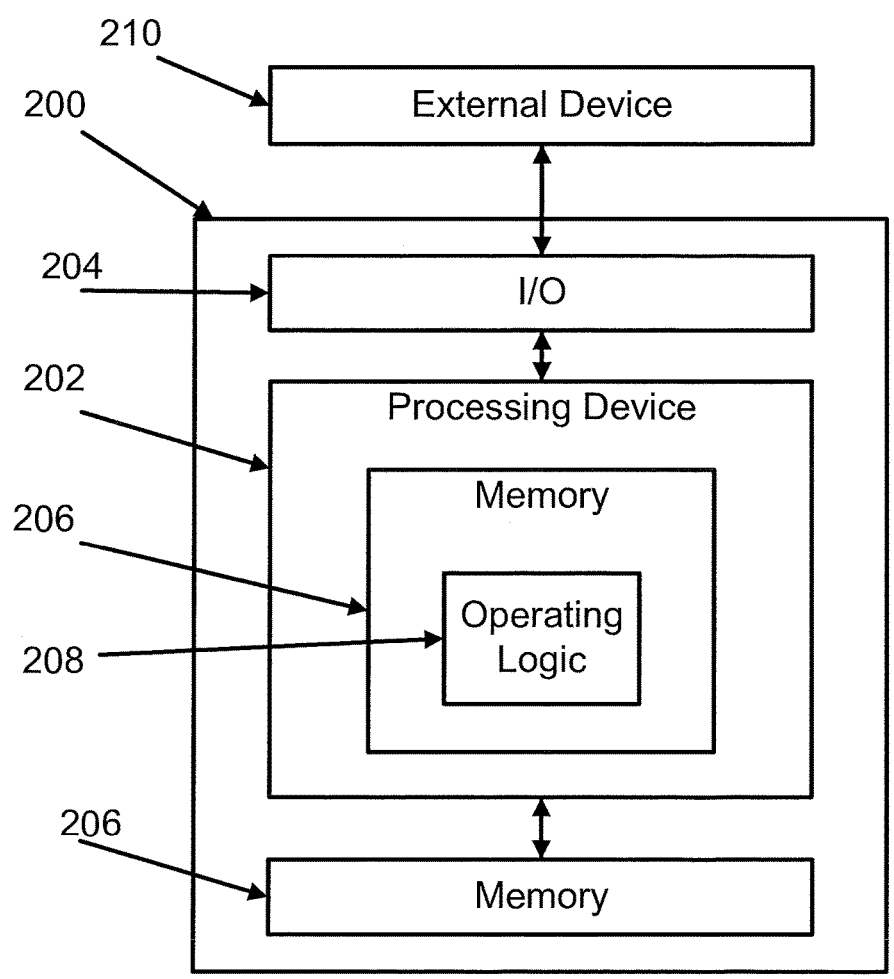
FIG. 2 is a schematic block diagram of an exemplary computing device.

FIG. 2 is a schematic block diagram of a computing device 200. The computing device 200 is one example of a server, a mobile device, a computer, and/or a reader device configuration that may be utilized in connection with the server 102, the mobile device 104, the computer 106, and/or the reader device 108 shown in FIG. 1. The computing device 200 includes a processing device 202, an input/output device 204, memory 206, and operating logic 208. Furthermore, computing device 200 communicates with one or more external devices 210.

The input/output device 204 allows the computing device 200 to communicate with the external device 210. For example, the input/output device 204 may be a transceiver, a network adapter, a network card, an interface, or a communication port (e.g., a USB port, serial port, parallel port, an analog port, a digital port, VGA, DVI, HDMI, FireWire, CAT 5, or any other type of communication port or interface). The input/output device 204 may be include hardware, software, and/or firmwaie. It is also contemplated that the input/output device 204 may include more than one of these adapters, cards, or ports.

The external device 210 may be any type of device that allows data to be inputted or outputted from the computing device 200. For example, the external device 210 may be a mobile device, a reader device, other electronic equipment, a handheld computer, a diagnostic tool, a controller, a computer, a server, a processing system, a printer, a display, an alarm, an illuminated indicator such as a status indicator, a keyboard, a mouse, or a touch screen display. Furthermore, it is contemplated that the external device 210 may be integrated into the computing device 200. It is further contemplated that there may be more than one external device in communication with the computing device 200.

Processing device 202 can be a programmable type, a dedicated hardwired state machine, or any combination thereof The processing device 202 may further include multiple processors, Arithmetic-Logic Units (ALUs), Central Processing Units (CPUs), Digital Signal Processors (DSPs), or the like. Processing devices 202 with multiple processing units may utilize distributed, pipelined, and/or parallel processing. Processing device 202 may be dedicated to performance of just the operations described herein or may be utilized in one or more additional applications. In the depicted form, processing device 202 is of a programmable variety that executes algorithms and processes data in accordance with operating logic 208, as defined by programming instructions (such as software or firmware) stored in memory 206. Alternatively or additionally, the operating logic 208 for the processing device 202 is at least partially defined by hardwired logic or other hardware. The processing device 202 may include one or more components of any type suitable to process the signals received from the input/output device 204 or elsewhere, and to provide desired output signals. Such components may include digital circuitry, analog circuitry, or a combination of both.

Memory 206 may be of one or more types, such as a solid-state variety, electromagnetic variety, optical variety, or any combination thereof. Furthermore, memory 206 can be volatile, nonvolatile, or a combination of these types, and some or all of memory 206 can be of a portable variety, such as a disk, tape, memory stick, cartridge, or the like. Additionally, memory 206 can store data that is manipulated by the operating logic 208 of the processing device 202, such as data representative of signals received from and/or sent to input/output device 204 in addition to or in lieu of storing programming instructions defining operating logic 208, just to name one example. As shown in FIG. 2, memory 206 may be included with the processing device 202 and/or coupled to the processing device 202.

Figure 3:
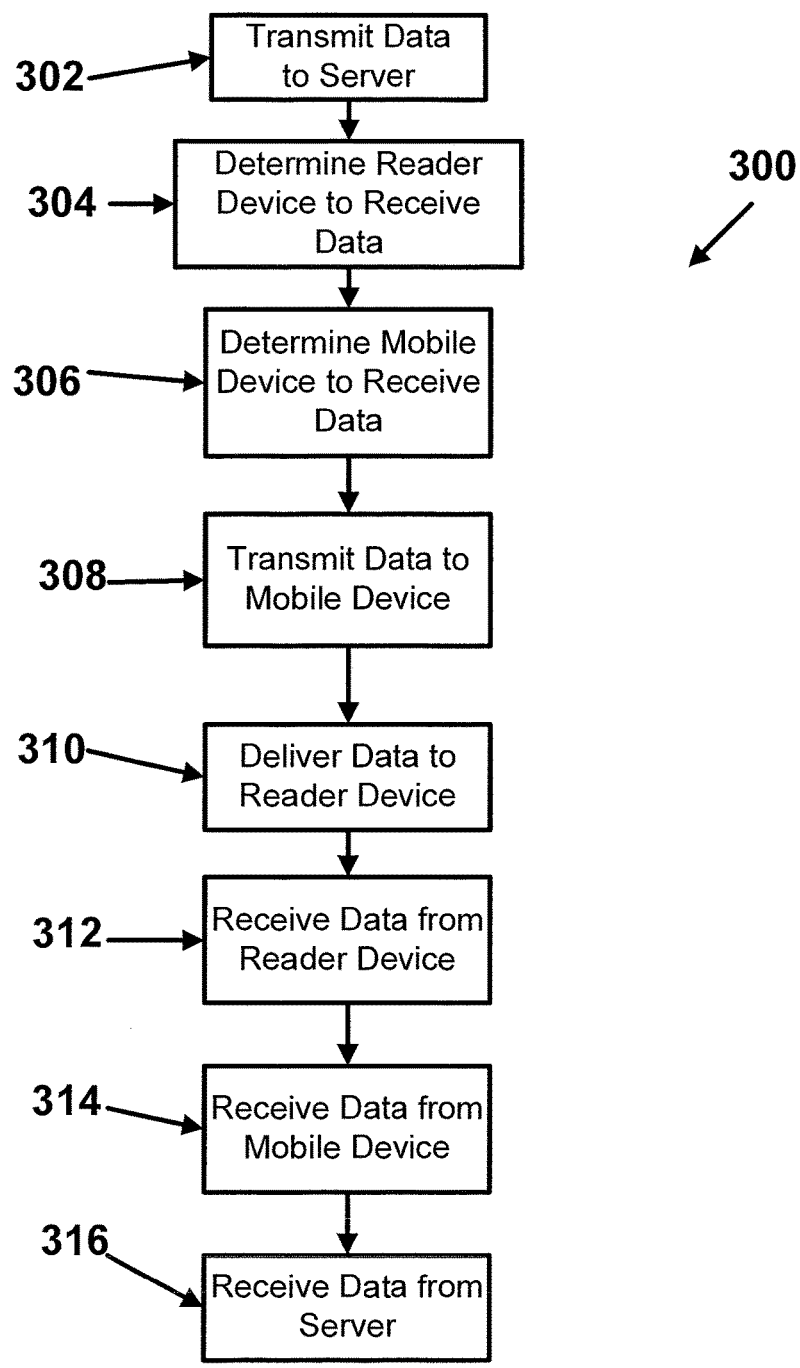
FIG. 3 is a schematic flow diagram of an exemplary process for communicating with a reader device.

FIG. 3 illustrates a schematic flow diagram of an exemplary process 300 for updating information in a reader device. Operations illustrated for all of the processes in the present application are understood to be examples only, and operations may be combined/divided and added/removed as well as re-ordered in whole or in part, unless explicitly stated to the contrary.

Process 300 begins at operation 302 in which a user may use the computer 106 to create, update, and/or modify access control information 114 that is transmitted and/or stored at the server 102. The server 102 may store the access control information 114 in the database 111.

Process 300 then proceeds from operation 302 to operation 304. At operation 304, the server 102, via the cloud application 110, determines which reader device 108 should receive new or updated information or data. The determination may be based on the content of the access control information 114 that is to be delivered to a reader device 108. For example, the information 114 may include access rights for a particular reader device 108. It is contemplated that more than one reader device 108 may receive the information 114, for example, in situations where several doors in a building have overlapping user access rights.

Process 300 then proceeds from operation 304 to operation 306. At operation 306, the server 102, via the cloud application 110, determines which mobile devices 104 should be used to virally transfer the information 114 from the server 102 to the reader device 108. The server 102, via the cloud application 110, may determine the targeted mobile devices 104 based on the access rights associated with each mobile device 104. For example, the server 102, via the cloud application 110, may transmit the information 114 in the form of viral data 112 to some or all of the mobile devices 104 of users who have access privileges to the reader device 108 (and the associated door) that is to receive the information 114. For example, the server 102, via the cloud application 110, may transmit the viral data 112 to only the mobile devices 104 that interact with the particular reader device 108 most frequently. As another example, the viral data 112 for the reader device 108 may be delivered to each mobile device 104 that has access to the particular reader device 108 immediately so that the next mobile device 104 to interact with the particular reader device 108 will deliver that viral data 112 to the reader device 108 as soon as possible.

Process 300 then proceeds from operation 306 to operation 308. At operation 308, the server 102, via the cloud application 110, transmits at least a portion of the information 114 in the form of viral data 112 to one or more of the mobile devices 104. The server 102 and the mobile devices 104 may communicate over an Internet connection. However, it is contemplated that other communication protocols and/or methods may be used in place of or in addition to the Internet connection.

Process 300 then proceeds from operation 308 to operation 310. At operation 310, one of the mobile devices 104 may deliver the viral data 112 to the reader device 108. For example, a user of the mobile device 104 may be attempting to access a secured area using the NFC transceiver in the mobile device 104. Without the user's knowledge, the mobile device 104 may transfer a credential and/or other data for the access request, but the mobile device 104 will also transfer the viral data 112 to the reader device 108. The reader device 108 will then store the viral data 112 in the appropriate location in memory and utilize the viral data 112.

Process 300 then proceeds from operation 310 to operation 312. At operation 312, the reader device 108 may send various data to the mobile device 104. For example, the reader device 108 may send a confirmation that the viral data 112 was successfully stored and/or installed in the reader device 108. As another example, the reader device 108 may transmit alarms and/or audit information to the mobile device 104. It is contemplated that the reader device 108 may transfer alarm information and/or audit information in the form of viral data 112 to one or more mobile devices 104 independent of receiving new and/or updated information from the server 102.

Process 300 then proceeds from operation 312 to operation 314. At operation 314, the mobile device 104 transfers the viral data 112 that the mobile device 104 received from the reader device 108 to the server 102. The server 102 and the mobile device 104 may communicate via an Internet connection. If the viral data 112 received from the mobile device 104 is a confirmation of a successful update, the server 102, via the cloud application 110, may notify the computer 106 and/or send a command to the other mobile devices 104 that also received the viral data 112 to delete the viral data 112 since the reader device 108 has already been updated successfully. If the viral data 112 constitutes alarm information and/or audit histories, the server 102 may store the alarm information and/or audit histories in the database 111.

Process 300 then proceeds from operation 314 to operation 316. At operation 316, the computer 106 may download the alarm information and/or audit histories from the database 111 at the server 102.

The various aspects of the process 300 in the present application may be implemented in the operating logic 208 as operations by software, hardware, artificial intelligence, fuzzy logic, or any combination thereof, or at least partially performed by a user or operator. In certain embodiments, operations represent software elements as a computer program encoded on a computer readable medium, wherein the server 102, the mobile device 104, the computer 106, and/or the reader device 108 performs the described operations when executing the computer program.

One aspect of the present application may include a method, comprising: receiving information at a server; storing the information in a database at the server; determining a reader device that is to receive the information based on an analysis of the information; selecting one or more mobile devices to deliver the information to the reader device; and transmitting viral data to the one or more mobile devices, wherein the viral data includes at least a portion of the information.

Features of the aspect of the present application may include: transmitting the viral data to the reader device from one of the mobile devices; wherein the mobile device and reader device communicate via near field communication; transmitting audit information from the reader device to one of the mobile devices; receiving the audit information at the server from one of the mobile devices; and storing the audit information in the database at the server; downloading at least a portion of the audit information from the database at the server via a computer; wherein the selecting is based on which mobile devices have access to the reader device; receiving a notification message at the server from the one mobile device, wherein the notification message indicates the reader device was successfully updated; and transmitting a command from the server to all of the other mobile devices to delete the viral data; wherein the information comprises updated access rights for the reader device; wherein the viral data includes a firmware update for the reader device.

Another aspect of the present application may include a system, comprising: a server configured to provide a cloud service; one or more mobile devices; and a reader device; and wherein the server is configured to: receive information and store the information in a database at the server, determine the reader device that is to receive the information based on an analysis of the information, select one or more mobile devices to deliver the information to the reader device, and transmit viral data to the one or more mobile devices, wherein the viral data includes at least a portion of the information, wherein the mobile device is configured to receive the viral data from the server and transmit the viral data to the reader device; and wherein the reader device is configured to receive the viral data from the mobile device.

Features of the aspect of the present application may include: wherein the one or more mobile devices and the reader device communicate via near field communication; wherein the system is at least one of an access control system, a payment system, and a transit system; wherein the reader device is further configured to transmit audit information to one of the mobile devices, wherein the server is further configured to receive the audit information from one of the mobile devices, and wherein the server is further configured to store the audit information in the database at the server; a computer configured to download at least a portion of the audit information from the database at the server.

Yet another aspect of the present application may include an apparatus, comprising: a server configured to receive information, store the information in a database at the server, determine a reader device that is to receive the information based on an analysis of the information, select one or more mobile devices to deliver the information to the reader device, and transmit viral data to the one or more mobile devices, wherein the viral data includes at least a portion of the information.

Features of the present application may include: wherein the server is further configured to: host audit information for retrieval by a computer; wherein the server is further configured to: receive a notification message from one of the mobile devices, wherein the notification message indicates the reader device was successfully updated; and transmit a command to at least one other of the mobile devices to delete the viral data; wherein the information comprises updated access rights for the reader device; wherein the viral data includes a firmware update for the reader device; wherein the server is configured to select the one or more mobile devices based on which mobile devices have access to the reader device.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A computer implemented method for updating a reader device with access control information, comprising: receiving access control information; determining a reader device that is to receive the access control information based on an analysis of the access control information; selecting at least two mobile devices from a plurality of mobile devices having access rights to the reader device to receive the access control information and a firmware update, wherein the at least two selected mobile devices are the mobile devices, from the plurality of mobile devices, that interact with the reader device most frequently; transmitting, to the at least two selected mobile devices, the access control information and the firmware update for the reader device and the firmware update is stored in each memory of each of the at least two selected mobile devices; transmitting the firmware update from one mobile device of the at least two selected mobile devices to the reader device; transmitting a confirmation that the firmware update of the reader device was successful from the reader device to the one of the at least two selected mobile devices; receiving a notification message at a server from the one of the selected mobile devices, wherein the notification message indicates that the firmware update of the reader device was successful; transmitting a command from the server to each of the at least two selected mobile devices to delete only the firmware update in response to the notification message received at the server from the one of the at least two selected mobile devices; and transmitting audit information from the reader device to one or more of the plurality of mobile devices independently of the access control information and the firmware update until the reader device receives a notification that the audit information was received at the server.

2. The method of claim 1, wherein the one of the at least two selected mobile devices and the reader device communicate via near field communication.

3. The method of claim 1, further comprising storing the audit information in the database at the server.

4. The method of claim 3, further comprising: downloading at least a portion of the audit information from the database at the server via a computer.

5. The method of claim 1, wherein the reader device is an electronic lock.

6. An access control system for updating a reader device, comprising: a server configured to provide a credential management service; a plurality of mobile devices; a reader device, the plurality of mobile devices having access rights to the reader device; wherein the server is configured to: receive access control information for the reader device, determine the reader device that is to receive the access control information based on an analysis of the access control information, select at least two mobile devices from the plurality of mobile devices having access rights to the reader device to receive the access control information and a firmware update for the reader device, wherein the at least two mobile devices are selected from the plurality of mobile devices based on a frequency that the at least two mobile devices interact with the reader device, and transmit, to the at least two selected mobile devices, the access control information and the firmware update for the reader device, wherein each of the at least two selected mobile devices are configured to receive the access control information and the firmware update from the server, each of the at least two selected mobile devices are further configured to store the firmware update in each memory of each of the at least two selected mobile devices, and transmit the access control information and the firmware update to the reader device; wherein the reader device receives the access control information and the firmware update from one of the at least two selected mobile devices; wherein the reader device is configured to transmit a confirmation that the firmware update of the reader device was successful from the reader device to the one of the at least two selected mobile devices, and the reader device is further configured to transmit audit information independently of the access control information and the firmware update to one or more of the plurality of mobile devices until the reader device receives a notification that the audit information was received at the server; and wherein the server is configured to receive a notification message from the one of the at least two selected mobile devices, wherein the notification message indicates that the Firmware update of the reader device was successful, and the server is configured to transmit a command from the server to each of the at least two selected mobile devices to delete only the firmware update in response to the notification message received at the server from the one of the at least two selected mobile devices.

7. The system of claim 6, wherein the one of the at least two selected mobile devices and the reader device communicate via near field communication.

8. The system of claim 6, wherein the reader device is an electronic lock.

9. The system of claim 6, wherein the server is further configured to store the audit information in the database at the server.

10. The system of claim 9, further comprising: a computer configured to download at least a portion of the audit information from the database at the server.

* * * * *